United States Patent

Trevisan et al.

Patent Number: 5,129,700
Date of Patent: Jul. 14, 1992

[54] BODY FOR A MOTOR VEHICLE

[75] Inventors: Luciano Trevisan, Grugliasco; Alfonso Bruno, Turin, both of Italy

[73] Assignee: Fiat Auto S.p.A., Turin, Italy

[21] Appl. No.: 618,898

[22] Filed: Nov. 28, 1990

[30] Foreign Application Priority Data

Dec. 18, 1989 [IT] Italy .................. 68111 A/89

[51] Int. Cl.⁵ .................. B62D 25/20
[52] U.S. Cl. .................. 296/196; 296/197; 296/204; 296/901
[58] Field of Search .............. 296/192, 196, 197, 203, 296/204, 209, 901

[56] References Cited

U.S. PATENT DOCUMENTS

| | | | |
|---|---|---|---|
| 2,188,267 | 1/1940 | Ledwinka et al. | 296/204 |
| 3,073,647 | 1/1963 | Beltz | 296/204 |
| 3,415,568 | 12/1968 | Gugelot et al. | 296/204 |
| 4,081,197 | 3/1978 | Ackel | 296/204 |
| 4,422,685 | 12/1983 | Bonfilio et al. | 296/197 |
| 4,865,378 | 9/1989 | Filtri et al. | 296/197 |
| 4,887,862 | 12/1989 | Bassi | 296/197 X |
| 4,900,083 | 2/1990 | Kumasaka et al. | 296/203 X |
| 4,917,435 | 4/1990 | Bonnett et al. | 296/197 X |
| 4,978,164 | 12/1990 | Nakamura et al. | 296/203 X |

FOREIGN PATENT DOCUMENTS

| | | |
|---|---|---|
| 171576 | 2/1986 | European Pat. Off. |
| 247570 | 12/1987 | European Pat. Off. |
| 298903 | 1/1989 | European Pat. Off. |
| 2848593 | 5/1980 | Fed. Rep. of Germany |
| 2923874 | 1/1981 | Fed. Rep. of Germany |
| 3035644 | 5/1982 | Fed. Rep. of Germany |
| 3635317 | 4/1988 | Fed. Rep. of Germany |
| 3932830 | 4/1990 | Fed. Rep. of Germany |
| 1137219 | 5/1957 | France |

OTHER PUBLICATIONS

*Automotive Engineering*, pp. 34–36, Jan. 1982.

Primary Examiner—Margaret A. Focarino
Assistant Examiner—Andrew C. Pike
Attorney, Agent, or Firm—Shlesinger Arkwright & Garvey

[57] ABSTRACT

A frame supports several fixed and moveable and closing panels and a floor pan defining the bottom of the interior of a vehicle. The floor pan is provided with attachment devices for fixing the floor pan to the lower surface of the frame. Several mechanical parts and assemblies can be secured to the floor pan to form a single unit prior to the floor pan being installed on the frame.

18 Claims, 9 Drawing Sheets

BODY FOR A MOTOR VEHICLE

BACKGROUND OF THE INVENTION

The present invention relates to a motor vehicle body of the type comprising a frame suitable for supporting several fixed and movable enclosing panels, and a floor pan defining the bottom of the interior of the vehicle. The frame normally comprises two side members, two front supports fixed to the front end of the side members and forming therewith a pre-defined angle, a front cross member suitable for attaching the ends of the supports together, and a rear cross member suitable for attaching the rear ends of the side members together.

In this type of body, the floor pan is normally fixed to the frame by non-dismountable means of attachment, for example by welding, or is fixed thereto using dismountable means of attachment normally comprising threaded parts.

This type of body presents some disadvantages.

First of all, complete body preparation requires a numerous lengthy operations; in fact, after the floor pan has been attached to the frame in the aforesaid manner, it is necessary to fix basic mechanical parts and assemblies to the body, such as the servo-brake device, pedals, steering support cradle, steering box, and seat support guides. These operations are difficult to execute, particularly because of the lack of access to the parts of the body to which these parts and assemblies must be attached.

Furthermore, a body of this type is difficult to assemble in a fully automated manner using dedicated machines and devices.

If the floor pan is fixed to the frame using dismountable means of attachment, for example screw attachment, the vehicle can be noisy due to vibration of the floor pan and the relative parts attached to the frame.

Finally, a body of this type can be excessively costly due to the numerous bending operations of the sheet metal from which both the frame or the floor pan are obtained; since these parts are of steel, the total weight of the body can be particularly high.

SUMMARY OF THE INVENTION

An aim of the present invention is to produce a body for a motor vehicle in which the disadvantages described can be eliminated.

Such an aim is achieved by means of a body substantially comprising a frame capable of supporting several fixed and mobile enclosing panels and a floor pan defining the bottom of the interior of the vehicle, the frame comprising two side members, two front supports fixed to the front end of the side members and forming thereby a pre-defined angle, a front cross member suitable for attaching the ends of the supports together, and a rear cross member suitable for attaching the rear ends of the side members together, characterized by the fact that the floor pan is provided with means of attachment suitable for fixing the floor pan to the lower surface of the frame and means of attachment suitable for fixing several mechanical parts and assemblies to floor pan to form a single unit, prior to the floor pan being fixed to the frame by the means of attachment.

BRIEF DESCRIPTION OF THE DRAWINGS

For a better understanding of the body of the present invention there is now given, by way of an example, a detailed description thereof with reference to the attached drawings in which.

DETAILED DESCRIPTION OF THE INVENTION

Figure 1:
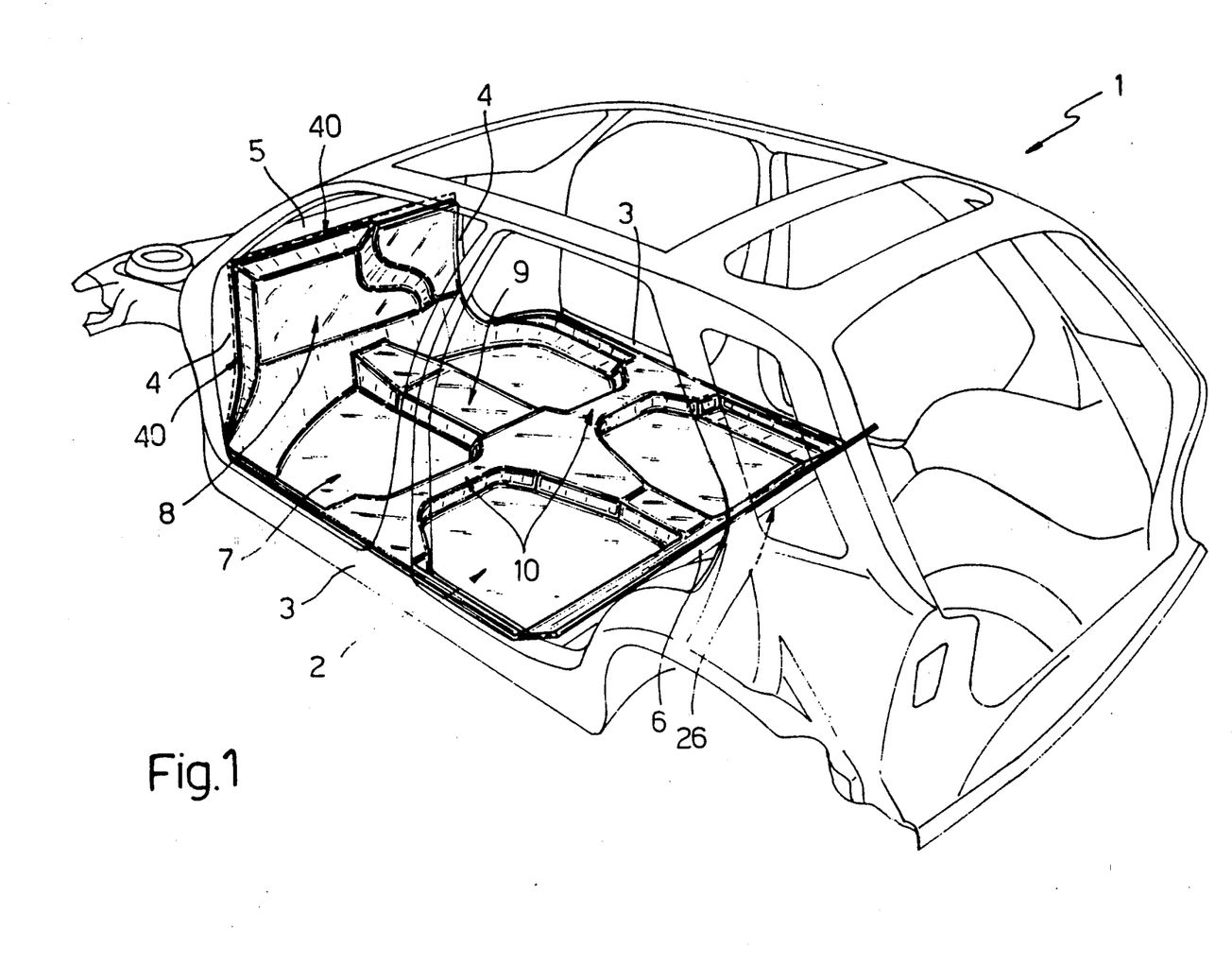
FIG. 1 represents a perspective view of the basic elements of the body of the invention.

The body of the invention substantially comprises a frame, indicated as a whole by reference 1 (FIG. 1), which is capable of supporting several fixed and movable enclosing panels (not shown) and a floor pan 2. The frame, in turn, comprises two side members 3, two front supports 4 fixed to the front end of the side members and forming thereby a pre-defined angle, a front cross member 5 suitable for attaching the ends of supports 4 together, and a rear cross member 6, suitable for attaching the rear ends of the side members together.

Figure 2:
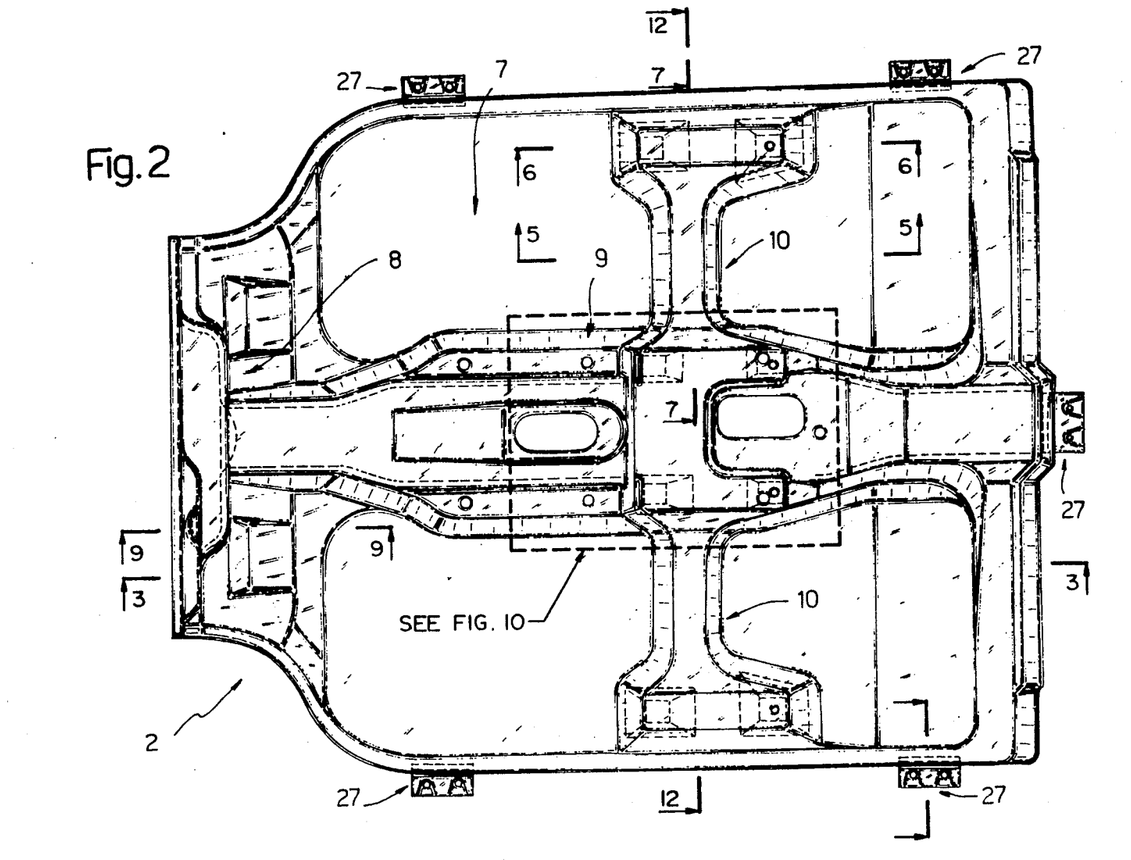
FIGS. 2, 3, and 4 represent plan, section taken along lines 3—3 of FIG. 2, and front views, respectively, of the floor pan of the body.
Figure 3:
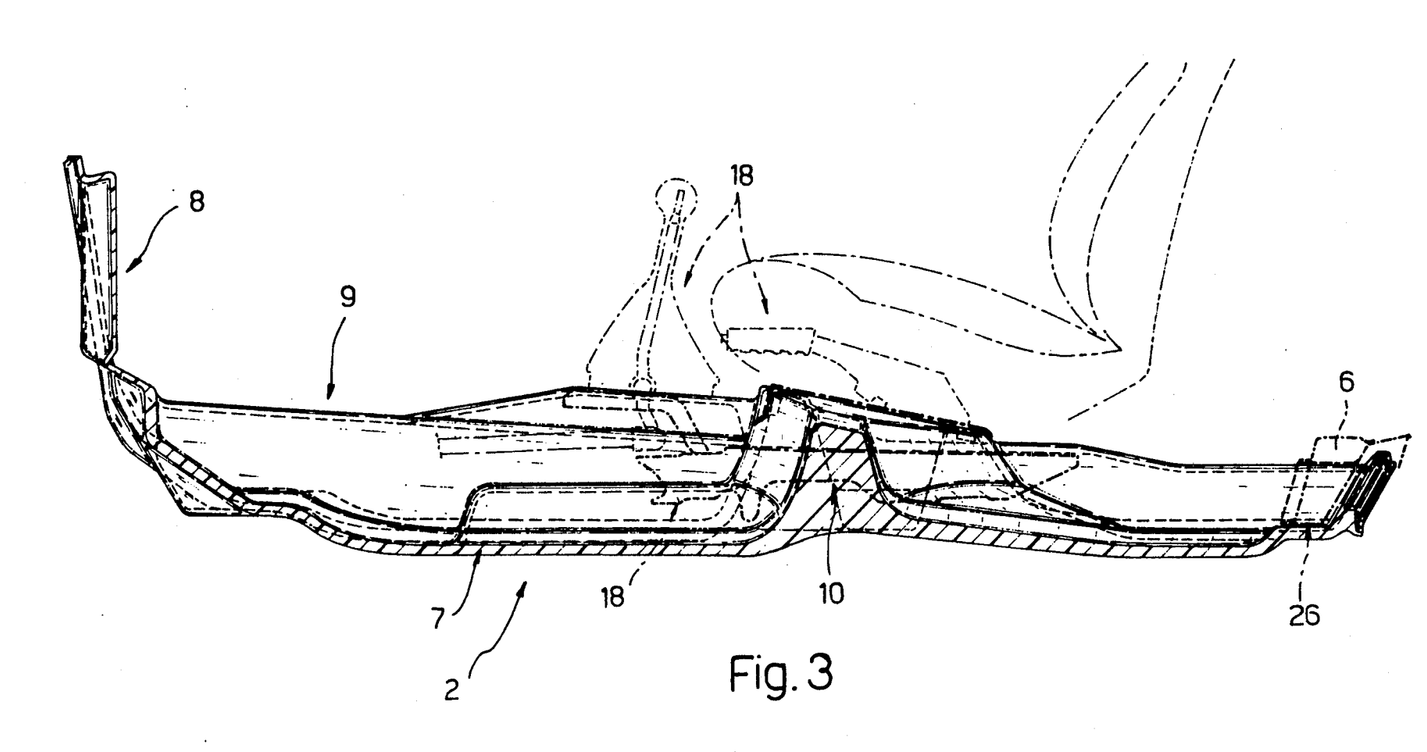
Figure 4:
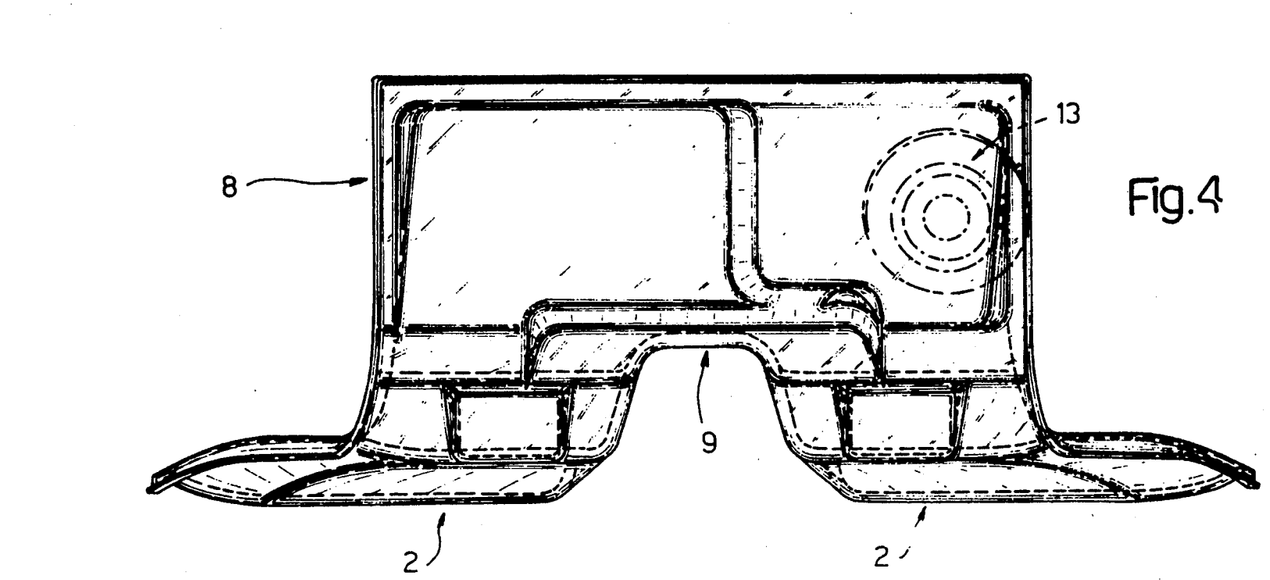
Figure 5:
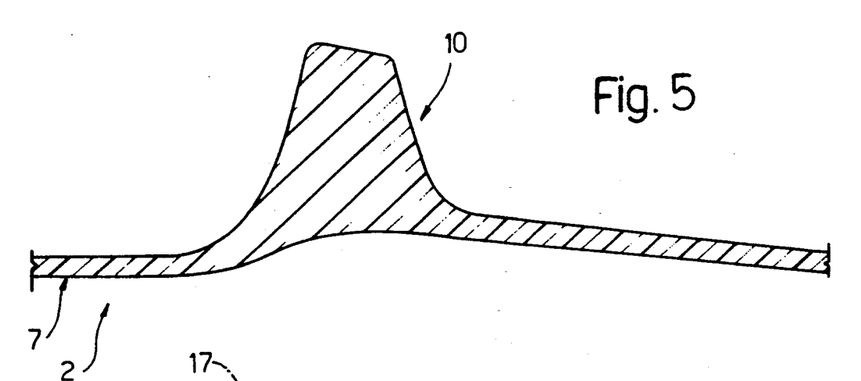
FIGS. 5 and 6 represent sections through the floor pan of FIGS. 2, through planes 5—5 and 6—6 respectively.

The floor pan 2, shown in FIGS. 2, 3, and 4, substantially comprises a floor 7 and a fireproof wall 8 forming a pre-defined angle with the former and suitable for dividing the engine compartment from the interior of the vehicle. The floor 7 is shaped so as to produce a tunnel 9 and a central cross member 10, visible in section in FIGS. 5 and 6.

Although the above-mentioned floor pan can be constructed of sheet metal, it is preferably constructed by forming a semifinished piece of plastic material; this comprises several layers of plastic material, at least two of which are external layers 11 (FIGS. 8, 14, 15, and 16) having a higher density and mechanical resistance and at least one intermediate layer 12 with a lower density.

Figure 9:
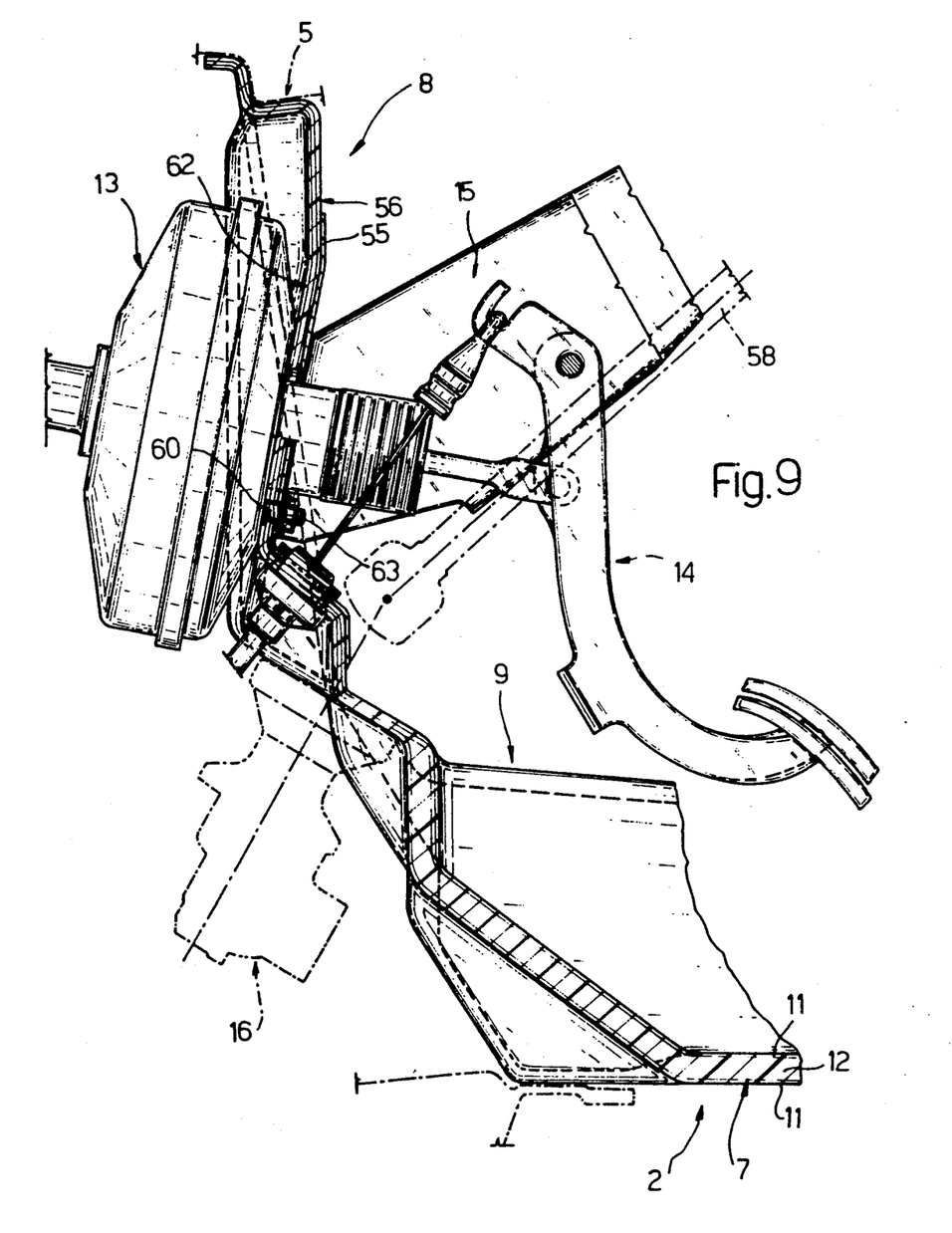
FIG. 9 represents a vertical section taken along lines 9—9 through the front part of the floor pan to which mechanical parts and assemblies of the motor vehicle are attached.
Figure 10:
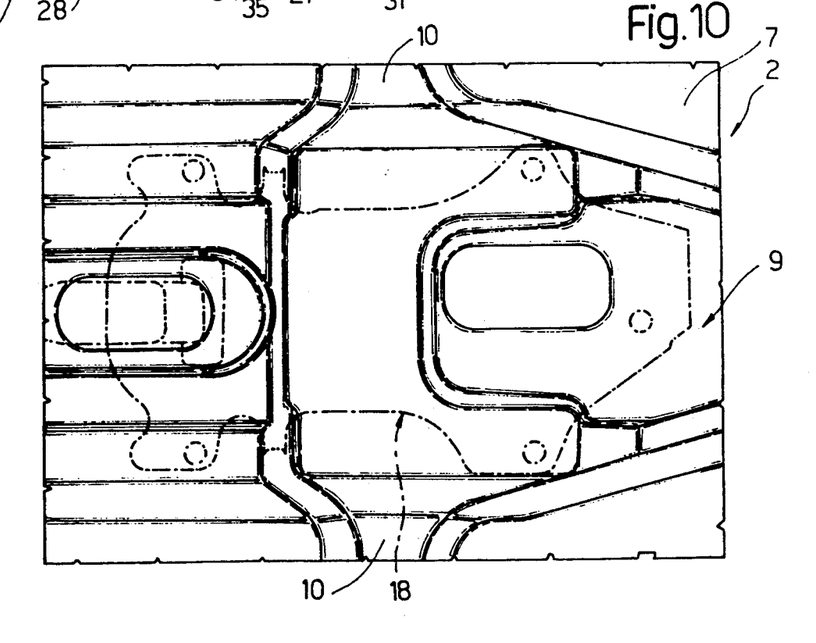
FIG. 10 represents a section taken along lines 10—10 through a part of the floor pan suitable for illustrating the attachment of another mechanical assembly to the floor pan.

The floor pan 2 is provided with means of attachment suitable for fixing it to the lower surface of the frame, and with means of attachment suitable for fixing several mechanical parts and assemblies to the floor pan to form thereby a single unit. This unit comprises, in addition to the floor pan, a servo-brake device 13 (FIG. 9), pedals 14, a steering support cradle 15, a steering box 16, two seat support guides 17 (FIG. 6), and an assembly 18 (FIG. 3) of which the handbrake and gear levers form a part.

The means for attaching the floor pan to the frame comprises a continuous seating 24 (FIG. 8) capable of resting against the lower surface 25 of side members 3 and on the lower surface 26 (FIG. 3) of rear cross member 6; such means of attachment further comprises several metal gussets 27 (FIGS. 2 and 8) each of which is suitable for resting against the lower surface 28 of the floor 7 and for attachment, by threaded organs of attachment 29, to side members 3 and rear cross member 6.

As is clearly seen in FIG. 2, some gussets 27 are provided, four of which are fixed to the side members and the others to the rear cross member 6 and front fireproof wall.

Figure 8:
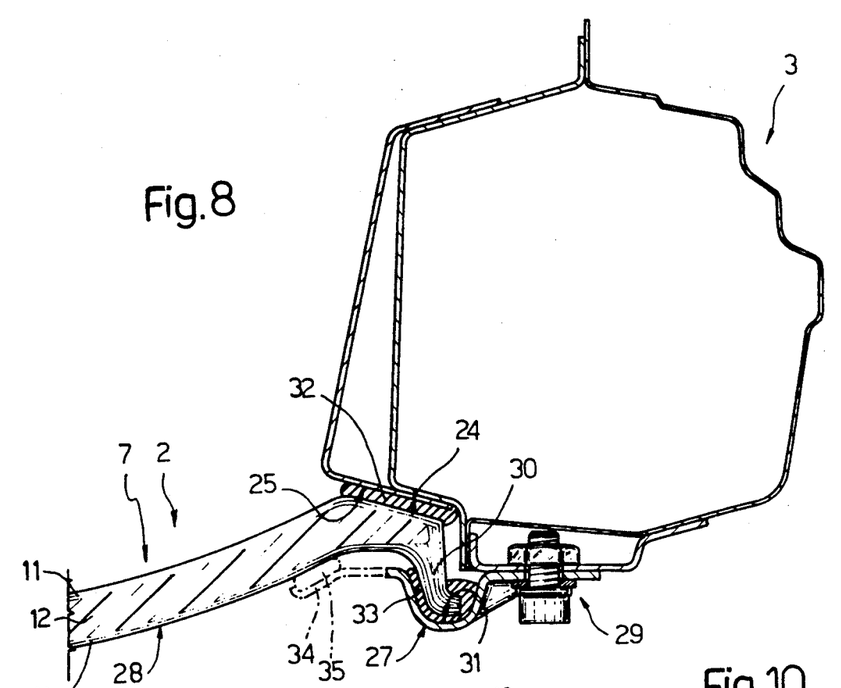
FIG. 8 represents a section taken along lines 8—8 through a side member of the body frame and a part of the floor pan thereof.

In FIG. 8, the edges of the floor 7 are formed to produce a rim 30 turned towards the base, and each gusset 27 has a concavity 31 suitable for housing the said rim. Furthermore, between the continuous seating 24 and the lower surfaces 25 and 26 respectively of side members 3 and rear cross member 6 is placed a layer of elastic adhesive 32; a similar layer of adhesive 33 is interposed between the rim 30 and the concavity 31. Finally, conveniently, each gusset 27 has a lug 34 suitable for resting against the lower surface 28 of the floor 7, with the interposition of a further layer of elastic adhesive 35.

The above-mentioned means of attachment suitable for fixing the floor pan 2 to the frame further comprises a layer of adhesive 40 (FIG. 1) placed between the edges of the fireproof wall 8 and the lower surfaces of the supporting elements 4 and front cross member 5.

Figure 11:
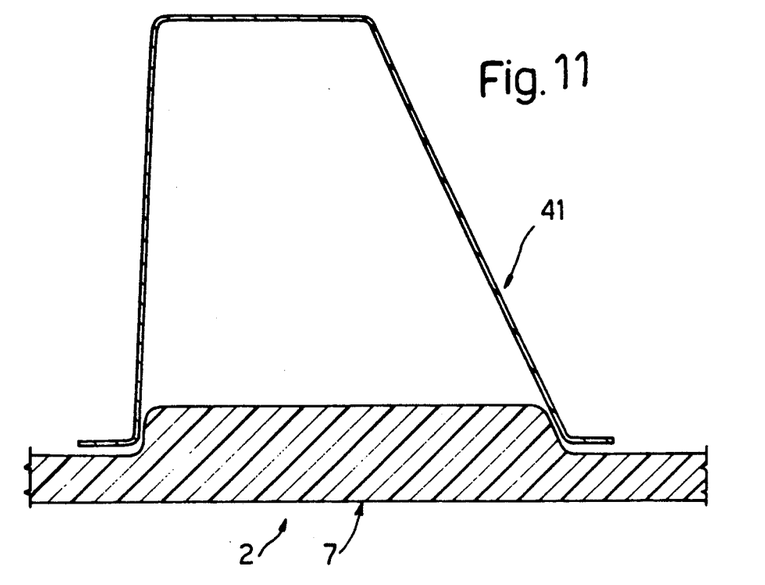
FIG. 11 represents a transversal section taken along lines 11—11 of FIG. 12 of a cross member fixed to the floor pan.
Figure 12:
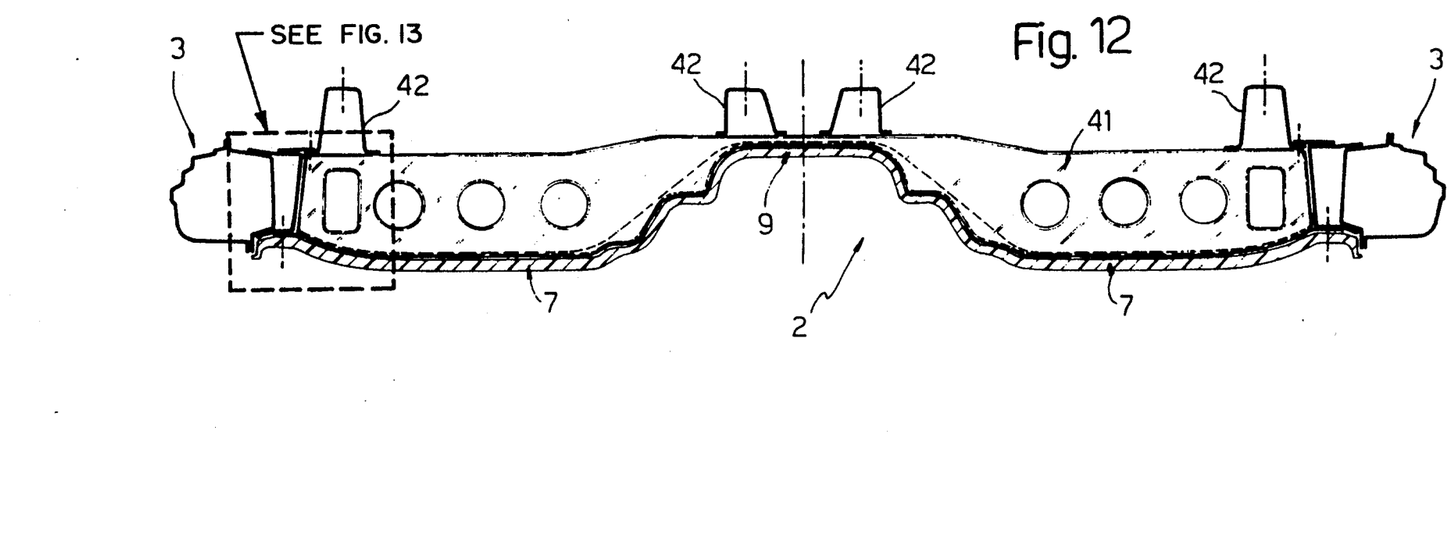
FIG. 12 represents a section viewed from the front of the floor pan taken along lines 12—12 of FIG. 2.
Figure 13:
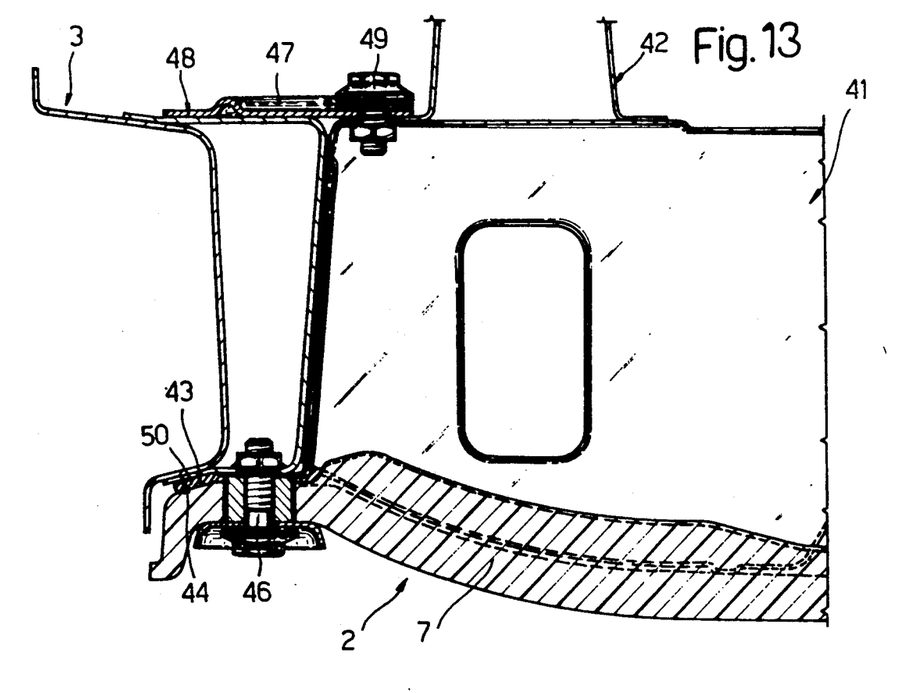
FIG. 13 represents a detail, on a larger scale, of FIG. 12 suitable for illustrating the manner in which the cross member is attached to the side members of the frame.

The floor pan 2, being constructed of a plastic material according to the aforementioned manner, may also comprise cross member 10 (FIG. 2), which is produced directly from the material of the floor 7. A separate cross member 41 (FIGS. 11 and 12) is constructed of sheet metal and has a substantially U-shaped section, as can be seen in FIG. 11. This central cross member is fixed, in the manner indicated, to the side members 3 and is suitable for supporting seat guides 42 (FIG. 12). Each end of the central cross member is attached to a corresponding side member 3 by means of attachment shown in FIG. 13. It comprises substantially a seating 43 obtained on the outer edge of the floor 7 and suitable for resting against the lower surface 44 of a corresponding side member, at least one bolt 46 suitable for attaching the said edge to the side member, and a lug 47 capable of being fixed, by at least one other bolt 49, to the end of the cross member. Between the seating 43 and the lower surface 44 of the side member is placed a layer of elastic adhesive 50.

The aforementioned means of attachment suitable for fixing several mechanical parts and assemblies to floor pan 2 substantially comprises a metal plate 55 (FIG. 9), fixed to the internal surface 56 of fireproof wall 8 and provided with a cradle 15 suitable for supporting the steering column 58 and pedals 14. The means of attachment further comprises several studs 60 fixed to the casing of the servo-brake 13, and several holes for these studs obtained in the fireproof wall and in the plate 55. The casing of the servo-brake is placed on the external surface 62 of the fireproof wall and the studs are secured by means of nuts 63, which therefore fix both the plate 55 and the servo-brake to the fireproof wall.

Figure 6:
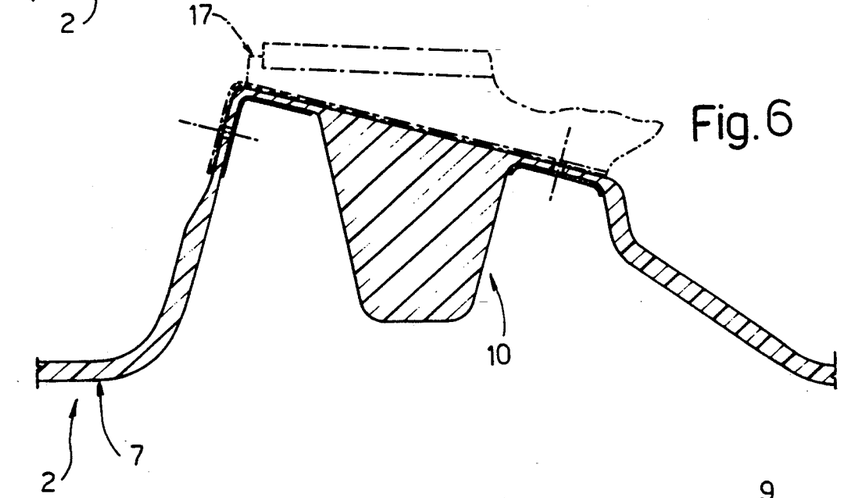
Figure 7:
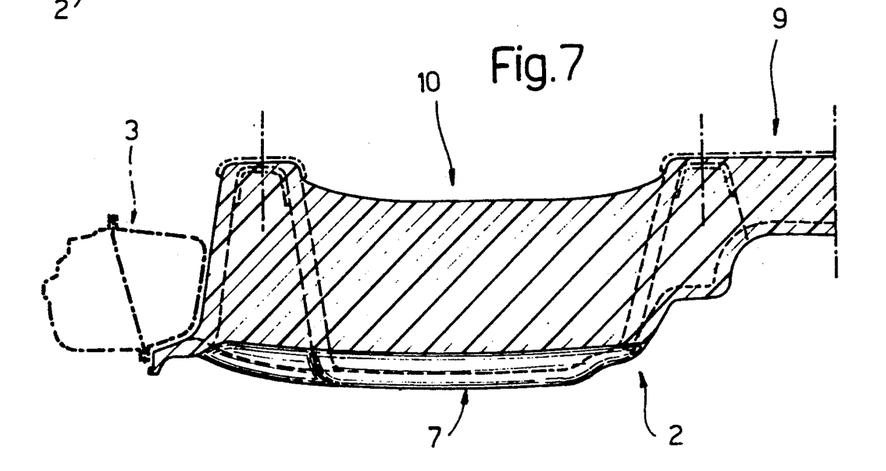
FIG. 7 represents a section of a part of the floor pan of FIG. 2 through plan 7—7.

The other mechanical parts and assemblies which are fixed to the floor pan 7 before the latter is fixed to the frame 2 are the steering box 16 (FIG. 9) and assembly 18 for the gear and handbrake levers (FIG. 3). Among the parts to be fixed to the floor pan include the seat guides 17 (FIG. 6).

Figure 14:
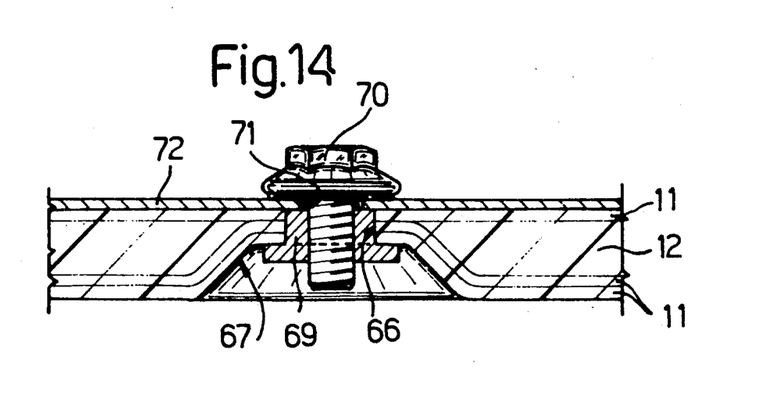
FIGS. 14 to 16 represent various forms of realization of the means for attaching mechanical parts and assemblies to the floor pan of the body.
Figure 15:
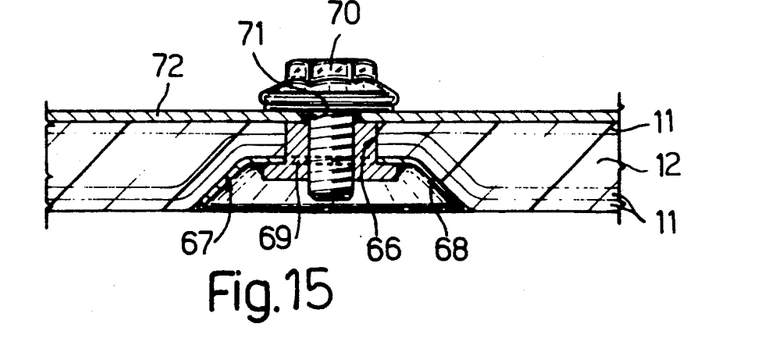
Figure 16:
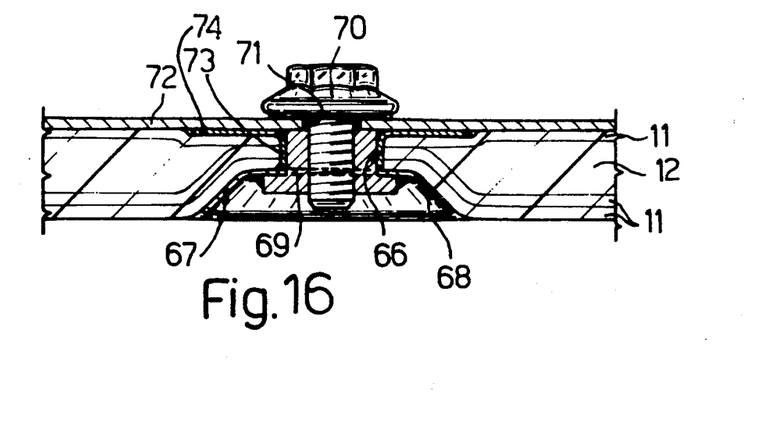

For the attachment of these latter mechanical parts and assemblies to the floor pan, means of attachment of the type shown in FIGS. 14 to 16 can be used. Such means comprise a hole 66 (FIG. 15) obtained in the floor pan, a cavity 67 made on a surface of the said floor pan coaxially with hole 66, a cup-shaped metal washer 68 housed in the cavity 67 and fixed by a nut 69, and a bolt 70 which passes through a hole 71 obtained in a wall 72 of the mechanical part or assembly to be fixed to the floor pan. As can be seen, the shank of the bolt 70 passes through the hole 71 and screws into threaded nut 69.

As can be clearly seen in the FIGS. 14–16, the nut 69 is provided with a brush or sleeve having the function of a distance piece, suitable for making contact with wall 72 of the mechanical part or assembly to be fixed to the floor pan.

Furthermore, conveniently, each of the means of attachment aforementioned can comprise a bush 73 (FIG. 16), inserted in hole 66 and provided with a flange 74 suitable for insertion between the floor pan and wall 72 of the mechanical part or assembly to be fixed to the floor pan.

Or, according to the more simplified form of FIG. 14, the metal washer 68 can be dispensed with.

The means of attachment illustrated in FIGS. 14 to 16 have different resistances, higher for that of the last of these figures; they can be used without distinction according to the mechanical resistance and stresses required of the attachment, but in each case are attached rigidly to the floor pan to enable the necessary tightening torque to be applied to ensure attachment of the various parts.

Such means of attachment can be mounted either by concurrent pressing or by adhesion or by another known method. In the, case of concurrent pressing, such means will be positioned in the press together with the fabric, and the resin which impregnates the fabric will ensure the adhesion thereof to the floor pan. In the case of adhesion between the metal cup-shaped washer 68 and the cavity 67, a layer of adhesive will be deposited. Mounting can be effected automatically by systems such as robots or mechanical arms, the tool holders of which will have a coil to heat the means of attachment to a suitable temperature. Alternatively, other heating systems with high density of energy can be used such as laser or electron beam. The heat passing from the metal element to the adhesive will give it a rapid pre-polymerization and render superfluous the passage of the floor pan through suitable jigs or ovens.

It is evident that the body described can be assembled with very simple and quick operations and at low cost. In fact, a unit of elements is first assembled comprising, in addition to the floor pan (2), mechanical parts and assemblies which have been described and which are fixed to the said floor pan, such as the servo-brake device 13, pedals 14, steering support cradle 1, steering box 16, seat support guides 17, and handbrake and gear lever assembly 18.

This unit can be prepared with extreme ease and in a fully automated manner, due to the notable accessibility offered by the floor pan. It, in turn, is mounted on the frame 2 by bringing it into contact with the lower surface of the said structure and using the means of attachment which have been described above.

The attachment between the floor pan and frame has a high mechanical resistance and does not produce substantial vibration which is a source of noise. In fact, the attachment between the floor pan 2, side members 3, and front and rear cross member 6 is effected by means of elastic elements, comprised of layers of elastic adhesive 32, 33, and 34 (FIG. 8) and layers of adhesive 40 (FIG. 1) which are interposed between the fireproof wall 8 and the front supports 4 and front cross member 5 of the frame.

If such a floor pan is constructed with plastic material it can be produced with the forming technology normally used for these materials. In such a case, the weight of the body is also significantly reduced.

It is evident that the described form of realization of the present invention can be provided with modifications and variations, either in respect of the form, or the arrangement of the various parts, without exceeding the scope of the invention.

We claim:

1. A body for a motor vehicle, said body comprising:
   a) a frame having two side members each having front and rear ends, and two front supports each being fixed to one of said front ends of said side members and forming therewith a predefined angle;
   b) a front cross member connected between said two front supports;
   c) a rear cross member extending between and attaching said side members together; and
   d) a floor pan defining a floor of an interior of the motor vehicle supported by said frame wherein;
   e) said floor pan includes a first means for attaching said floor pan to said frame and also includes a second means for attaching additional mechanical parts to said floor pan to form a single unit prior to attaching said floor pan to said frame; and
   f) said first means for attaching said floor pan to said frame includes a continuous seating on three sides of said floor pan for resting against said side members and said rear cross member.

2. The body as set forth in claim 1, wherein:
   a) said additional mechanical parts includes a servobrake device, pedals, a steering support cradle, a stering box, two seat support guides, and a handbrake and gear lever assembly.

3. The body as set forth in claim 2, wherein:
   a) said floor pan is shaped to produce a longitudinal tunnel and is provided with an opening for passage of parts attached to the handbrake and gear lever assembly.

4. The body as set forth in claim 3, wherein:
   a) said floor pan is further shaped to produce a central cross member; and
   b) said central cross member includes holes to accommodate attaching supporting said seat guides to said floor pan.

5. The body as set forth in claim 1, wherein:
   a) said floor pan has a first wall forming the floor of said interior and a second wall for creating a fireproof wall separating the interior from the motor vehicle's engine compartment.

6. The body as set forth in claim 5, wherein:
   a) said first attachment means conncects pre-defined zones of said floor pan to said side members and said rear cross member and said fireproof wall and said supports and said front cross member.

7. The body as set forth in claim 5, wherein:
   a) said first attachment means includes a layer of adhesive joining said fireproof wall with said supports and said front cross member.

8. The body as set forth in claim 5, wherein:
   a) said second attachment means fixes said additional mechanical parts to said floor pan;
   b) said second attachment means includes a metal plate located on said fireproof wall; and
   c) said metal plate includes a cradle for supporting a steering column and pedals.

9. The body as set forth in claim 1, wherein:
   a) said floor pan is formed of semi-finished plastic material; and
   b) said floor pan has at least two external layers of higher density plastic material and an intermediate layer of a lower density plastic material.

10. The body as set forth in claim 1, wherein:
    a) said floor pan includes edges shaped to produce a downturned rim; and
    b) said body further includes a plurality of gussets for forming a concavity suitable for housing said rim.

11. The body as set forth in claim 10, wherein:
    a) each of said gussets includes a lug for resting against said floor pan.

12. The body as set forth in claim 11, wherein:
    a) an elastic layer of adhesive is located between said continuous seating and lower surfaces of said side members, between said rim, each of said concavities of the gussets, and between lower surfaces of said floor pan and said lug.

13. The body as set forth in claim 1, wherein:
    a) each side member has connected thereto two gussets and said rear cross member has connected thereto one gusset.

14. The body as set forth in claim 1, wherein:
    a) a metal cross member having a substantially U-shaped section contacts said floor pan for supporting seat guides; and
    b) said metal cross member has a pair of ends, each end of said metal cross member being attached to a corresponding said side member.

15. The body as set forth in claim 14, wherein:
    a) said metal cross member is attached to said corresponding side member by a plurality of attachment parts, each of said side members having an upper surface and a lower surface;
    b) said parts include a seating located on a peripheral edge of said floor pan for resting against the lower surface of said corresponding side member;
    c) at least one bolt secures said edge to said corresponding side member;
    d) a lug rests against the upper surface of said corresponding side member and is secured by at least one other bolt to said metal cross member; and
    e) a layer of adhesive is interposed between said seating and the lower surface of said corresponding side member.

16. The body as set forth in claim 1, wherein:
    a) said second attachment means includes a hole in said floor pan;
    b) a cavity is formed on a surface of said floor pan coaxially with said hole;
    c) a washer is housed in said cavity and forms a cup; and d) said washer is secured by a bolt which passes through said hole and said washer and is held in position by a nut.

17. The body as set forth in claim 16, wherein:
a) said nut includes a sleeve.

18. The body as set forth in claim 16, wherein:
a) said second attachment means includes a bush inserted into said hole; and
b) said bush includes a flange located between said floor pan and a wall of one of said parts.

* * * * *